(12) United States Patent
Wong

(10) Patent No.: US 9,495,270 B2
(45) Date of Patent: Nov. 15, 2016

(54) USER INTERFACE FOR MONITORING THE STATUS OF AN OBJECT IN A VIRTUAL COMPUTING ENVIRONMENT

(75) Inventor: Karen Natalie Wong, San Carlos, CA (US)

(73) Assignee: VMware, Inc., Palo Alto, CA (US)

( * ) Notice: Subject to any disclaimer, the term of this patent is extended or adjusted under 35 U.S.C. 154(b) by 94 days.

(21) Appl. No.: 13/149,506

(22) Filed: May 31, 2011

(65) Prior Publication Data

US 2012/0311475 A1 Dec. 6, 2012

(51) Int. Cl.
| | | |
|---|---|---|
| *G06F 11/30* | (2006.01) | |
| *G06F 11/32* | (2006.01) | |
| *G06F 11/34* | (2006.01) | |
| *G06F 3/0481* | (2013.01) | |

(52) U.S. Cl.
CPC ......... *G06F 11/3003* (2013.01); *G06F 11/328* (2013.01); *G06F 3/0481* (2013.01); *G06F 11/3409* (2013.01); *G06F 2201/81* (2013.01); *G06F 2201/815* (2013.01)

(58) Field of Classification Search
CPC .... G06F 9/455; G06F 9/4443; G06F 3/0481; G06F 11/328
USPC ........................... 715/772, 771; 705/2; 345/7
See application file for complete search history.

(56) References Cited

U.S. PATENT DOCUMENTS

| | | | | |
|---|---|---|---|---|
| 5,714,971 A * | 2/1998 | Shalit et al. | ................... | 715/804 |
| 6,141,003 A * | 10/2000 | Chor et al. | ...................... | 715/719 |
| 6,191,807 B1* | 2/2001 | Hamada et al. | ........... | 348/14.07 |
| 7,363,593 B1* | 4/2008 | Loyens et al. | ................. | 715/853 |
| 8,032,621 B1* | 10/2011 | Upalekar et al. | ............. | 709/223 |
| 8,151,194 B1* | 4/2012 | Chan et al. | ..................... | 715/716 |
| 2002/0138602 A1* | 9/2002 | Vinberg | ......................... | 709/223 |
| 2004/0243778 A1* | 12/2004 | Barrios | .................. | H04L 29/06 |
| | | | | 711/165 |
| 2005/0219151 A1* | 10/2005 | Li et al. | ............................ | 345/7 |
| 2007/0240071 A1* | 10/2007 | Sherrill et al. | ................ | 715/764 |
| 2008/0098309 A1* | 4/2008 | Fries et al. | ..................... | 715/734 |
| 2008/0140448 A1* | 6/2008 | Hernandez et al. | ............. | 705/2 |
| 2010/0318931 A1* | 12/2010 | Boykin et al. | ................ | 715/771 |

* cited by examiner

*Primary Examiner* — Jennifer To
*Assistant Examiner* — Li Sun

(57) ABSTRACT

A graphical user interface for monitoring a status of objects included in a virtualized computing environment including a plurality of host computers, each having one or more virtual machines running therein, includes a first second and a second section. The first section displays a first graph depicting utilization during a first period of time of a first computing resource associated with a first object included in the virtualized computing environment. The second section displays a listing of one or more objects included in the virtualized computing environment that are related to the first object, where, in response to receiving a selection of a second object from the listing of one or more objects, the first section displays a second graph depicting utilization during the first period of time of the first computing resource associated with the second object.

14 Claims, 12 Drawing Sheets

USER INTERFACE FOR MONITORING THE STATUS OF AN OBJECT IN A VIRTUAL COMPUTING ENVIRONMENT

BACKGROUND

Computer virtualization is a technique that involves encapsulating a physical computing machine platform into a virtual machine that is executed under the control of virtualization software running on a single hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

A virtualization management software is used by an administrator to manage the configuration of the virtual machines and the allocation of computing resources to the virtual machines. Because of the large number of virtual machines to be managed within a single data center, and sometimes, across multiple data centers, some of the administrator's tasks are automated. For example, software automated techniques such as dynamic resource scheduling and dynamic power management have been developed to assist the administrator in balancing workloads across host systems and powering host systems ON and OFF as needed.

One feature of the virtualized computing environment that is controlled by the virtualization management software is health monitoring feature that monitors the status, or "health," of objects included in the virtualized computing environment. Conventional techniques for monitoring the status of objects include setting alarms. An alarm is triggered when a particular metric associated with the object exceeds a predefined threshold. For example, a virtual machine may be associated with an alarm that is triggered when CPU (central processing unit) usage of the virtual machine exceeds 80%. A user, such as an administrator, that interacts with the virtualization management software is notified that the alarm has been triggered and can perform some action to remedy the situation.

With conventional monitoring techniques, even when appropriate alarm triggers have been set, it can sometimes be difficult for the user to troubleshoot a problem because the user interface for attending to problems is too static and/or rigid. As a result, the administrator cannot easily determine the cause or source of a problem in the virtualized computing environment.

Accordingly, there remains a need in the art for a user interface for managing a virtualized computing environment that addresses the drawbacks and limitations discussed above.

SUMMARY

One or more embodiments of the invention provide a "workspace" that enables the user to explore an area of interest in the virtualized computing environment while troubleshooting a problem. The workspace provides a supportive environment that is flexible, intelligent, and maintains a context of the user's activities. For example, users can select and bring an object (e.g., a virtual machine) into view in the workspace. This causes appropriate tools and suggested actions to be displayed. In addition, the workspace can illustrate one or more computing resources utilized by the selected object. The user can also navigate to objects in the virtual computing environment that are related to and displayed in the workspace in the same "context" as the selected object. In some embodiments, the details of the related objects can be displayed in workspace for the same time period and for the same computing resource as for the selected object. By providing these features, a user interface according to one or more embodiments of the present invention allows the user to more quickly and easily troubleshoot and resolve issues in the virtualized computing environment.

One embodiment of the invention provides a graphical user interface for monitoring a status of objects included in a virtualized computing environment including a plurality of host computers, each having one or more virtual machines running therein, that includes a first second and a second section. The first section displays a first graph depicting utilization during a first period of time of a first computing resource associated with a first object included in the virtualized computing environment. The second section displays a listing of one or more objects included in the virtualized computing environment that are related to the first object, where, in response to receiving a selection of a second object from the listing of one or more objects, the first section displays a second graph depicting utilization during the first period of time of the first computing resource associated with the second object.

DETAILED DESCRIPTION

Figure 1A:
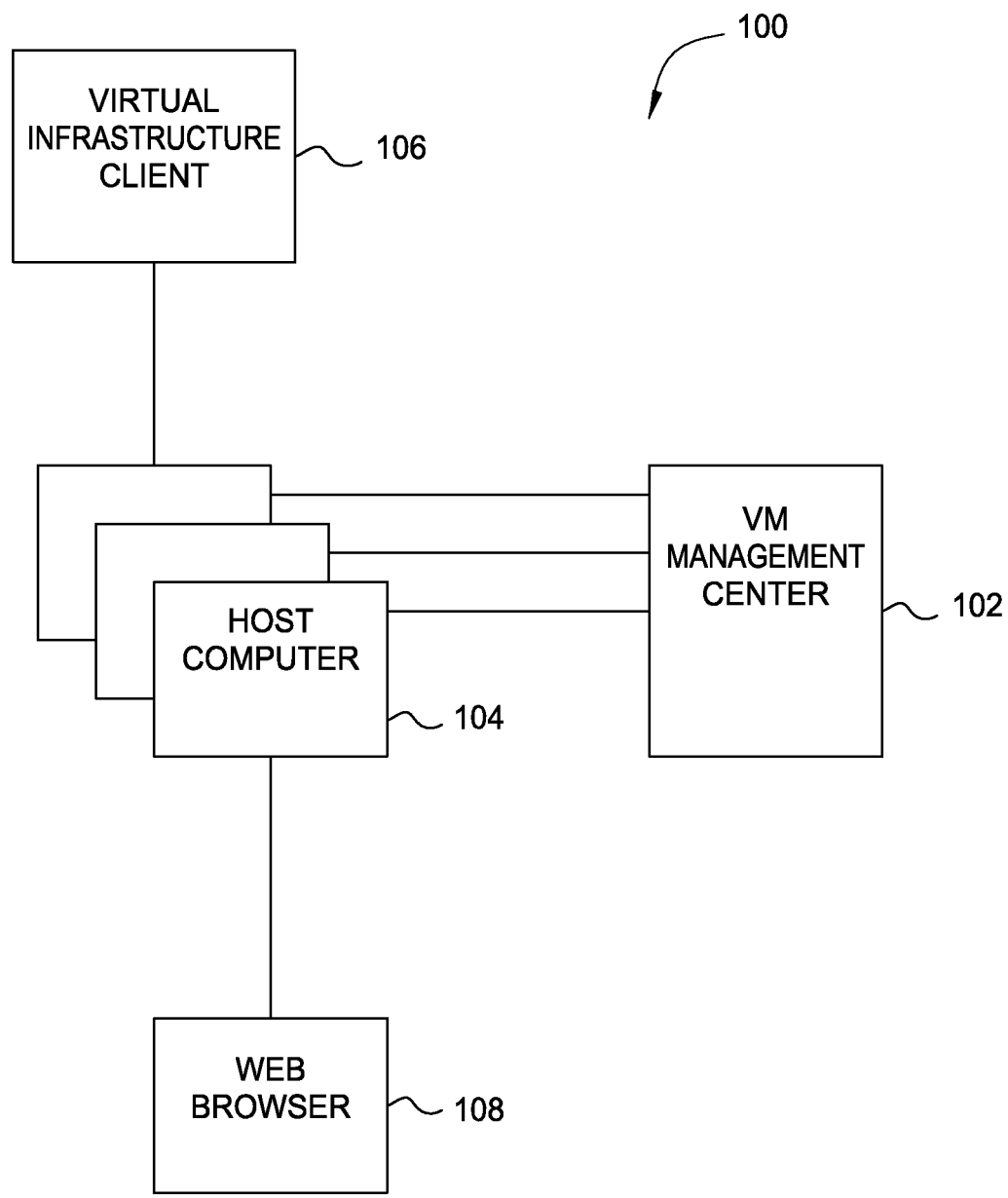
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. Host computers 104 (also referred to herein as "servers") are configured to deliver virtualization-based distributed services to information technology environments. Each host computer 104 provides a virtualization layer that abstracts processor, memory, storage, and/or networking resources into multiple virtual machines that run side-by-side on the same physical host computer 104. In one embodiment, virtualization software can be installed directly on the server hardware and inserts a virtualization layer between the hardware and the operating system. The virtualization software partitions a physical host computer 104 into multiple secure and portable virtual machines that run on the same physical server. Each virtual machine represents a complete system—with processors, memory, networking, storage, and/or BIOS.

A virtual machine (VM) management center 102 is also included in the system 100. The VM management center 102 manages the virtual infrastructure, including managing the host computers 104, the virtual machines running within each host computer 104, provisioning, migration, resource allocations, and so on.

According to various embodiments, implementing a virtualized system simplifies management with a management application, such as the Virtual Infrastructure (VI) Client 106, that can be used to perform tasks. Each server configuration task, such as configuring storage and network connections or managing the service console, can be accomplished centrally through the VI Client 106. One embodiment provides a stand-alone application version of the VI Client 106. In another embodiment, a web browser application 108 provides virtual machine management access from any networked device. For example, with the browser version of the client 108, giving a user access to a virtual machine can be as simple as providing a URL (Uniform Resource Locator) to the user.

According to some embodiments, user access controls of the VM management center 102 provide customizable roles and permissions so an administrator can create roles for various users by selecting from an extensive list of permissions to grant to each role. Responsibilities for specific virtualized infrastructure components, such as resource pools, can be delegated based on business organization or ownership. VM management center 102 can also provide full audit tracking to provide a detailed record of every action and operation performed on the virtual infrastructure.

Figure 1B:
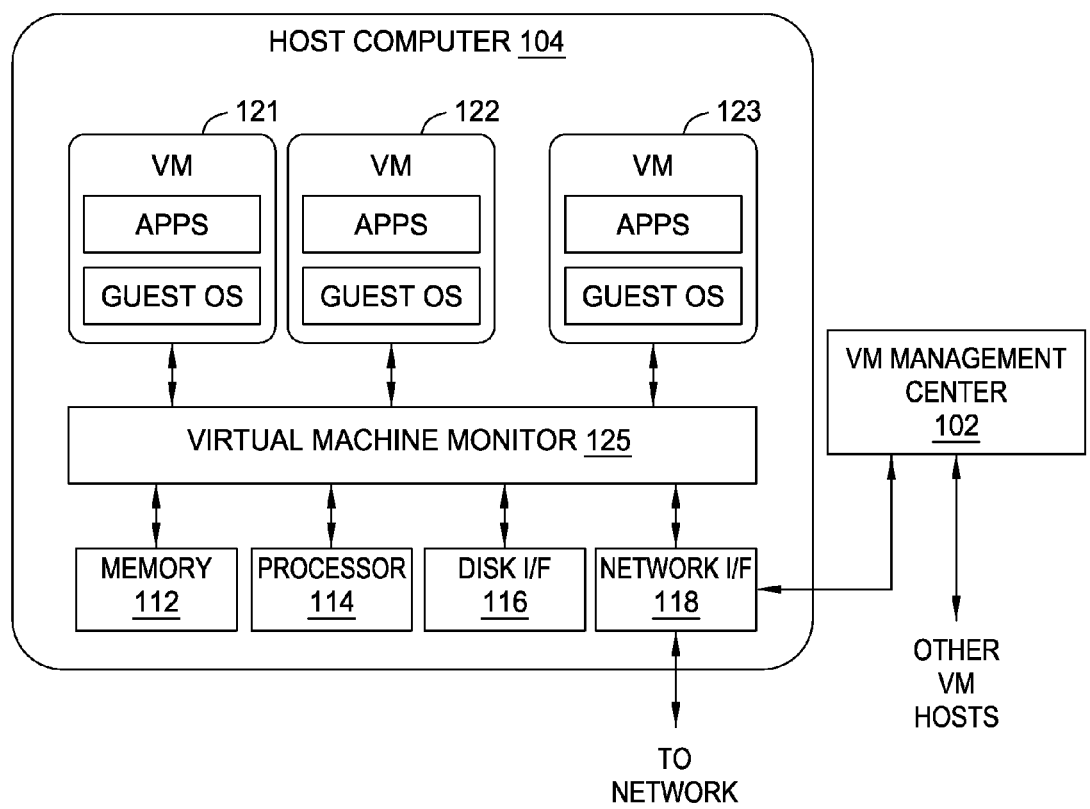
FIG. 1B depicts a block diagram of a host computer and virtual machine (VM) management center, according to one embodiment of the invention.

FIG. 1B depicts a block diagram of a host computer 104 and VM management center 102, according to one embodiment of the invention. A virtualized environment includes a host computer 104 that has conventional components of a computing device, and may be implemented within a cluster of computing devices. One or more virtual machines are configured within the host computer 104, represented in FIG. 1B as VM 121, VM 122, and VM 123, that share hardware resources of host computer 104, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118.

The virtual machines VM 121-123 run on top of a virtual machine monitor 125, which is a software interface layer that enables sharing of the hardware resources of host computer 104 by the virtual machines. Virtual machine monitor 125 may run on top of the operating system of the host computer 104 or directly on hardware components of the host computer 104. In some embodiments, virtual machine monitor 125 runs on top of a hypervisor that is installed on top of the hardware resources of host computer 104. Together, the virtual machines 121-123 and virtual machine monitor 125 create virtualized computer systems that give the appearance of being distinct from host computer 104 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 104 is served by a storage area network (SAN) (not shown), which includes a storage array (e.g., a disk array) and a switch (SAN fabric) that connects host computer 104 to storage array 160 via the disk interface 116. In virtualized computer systems, in which disk images of virtual machines are stored in the storage arrays, disk images of virtual machines can be migrated between storage arrays as a way to balance the loads across the storage arrays. For example, the Storage vMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2:
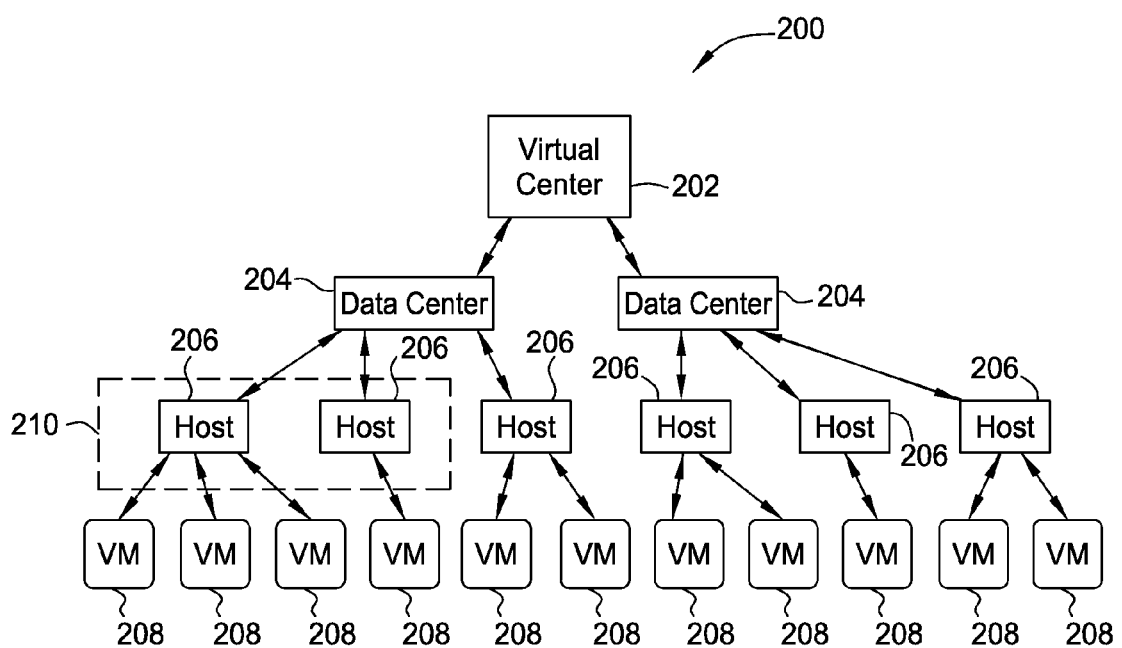
FIG. 2 depicts a hierarchical organization of a virtualized computing environment, according to one embodiment of the invention.

FIG. 2 depicts a hierarchical organization of a virtualized computing environment 200, according to one embodiment of the invention. As shown, a virtual center 202 is at the root of the hierarchy. The virtual center 202 includes one or more data centers 204. Each data center 204 includes one or more host computers 206. A set of host computers 206 can also be organized as a cluster 210. Each host computer 206 can run one or more virtual machines (VMs). In some embodiments, one or more monitoring profiles can be defined for the virtual computing environment 200. The monitoring profiles can be applied to one or more objects in the virtualized computing environment 200 (i.e., applied to the virtual center 202, data centers 204, host computers 206, and/or virtual machines 208) to monitor the status of the objects in the virtualized computing environment 200.

In one embodiment, a monitoring profile includes a collection of rules with expected values of performance or activity defined for an object in the virtualized computing environment. The rules can be associated with actions, alerts, or other operations that are performed if the rules are violated. In one embodiment, monitoring profiles are object-type specific. In another embodiment, monitoring profiles are not object-type specific and can be applied to any type of object in the hierarchy of a virtualized computing environment.

Embodiments of the invention provide a "workspace" that enables the user to explore an area of interest in the virtualized computing environment while troubleshooting a problem. The workspace provides a supportive environment that is flexible, intelligent, and maintains a context of the user's activities. For example, users can select and bring an object (e.g., a virtual machine) into view in the workspace. This causes appropriate tools and suggested actions to be displayed. In addition, the workspace can illustrate one or more computing resources utilized by the selected object. The user can also navigate to objects in the virtual computing environment that are related to and displayed in the workspace in the same "context" as the selected object. In some embodiments, the details of the related objects can be displayed in workspace for the same time period and for the same computing resource as for the selected object. By providing these features, a user interface according to one or more embodiments of the present invention allows the user to more quickly and easily troubleshoot and resolve issues in the virtualized computing environment. A workspace is a flexible work area for users to explore and tinker with objects in the virtualized computing environment. The workspace can provide contextual tools to aid the user in their exploration or task. Additionally, the workspace retains a history of the activities viewed in the workspace so that the user can easily go back and see what path they have come from, and can take another path if so desired.

Figure 3:
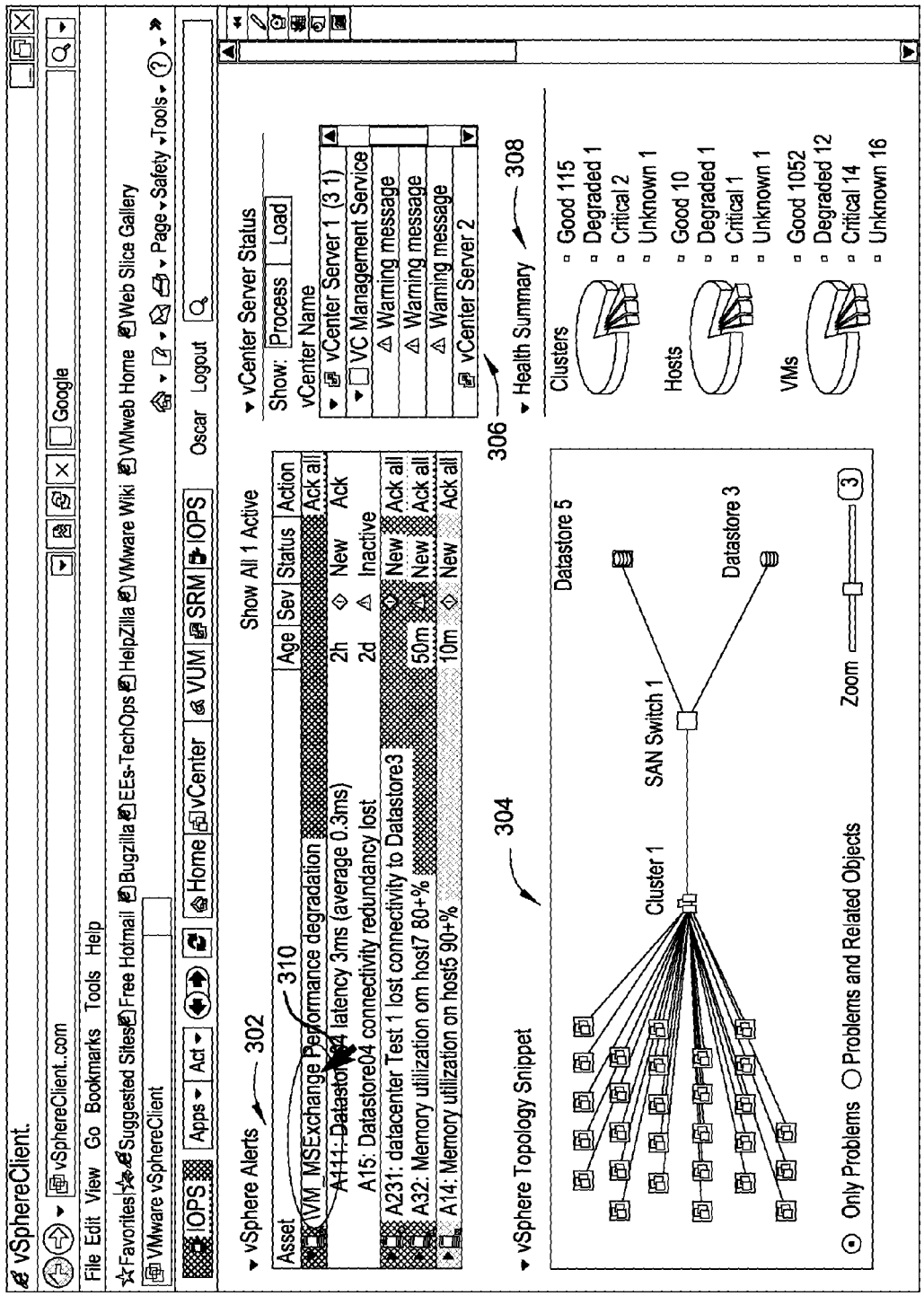
FIG. 3 depicts an alert listing dashboard displayed in a virtualization management software application, according to one embodiment of the invention.

FIG. 3 depicts an alert listing dashboard displayed in a virtualization management software application, according to one embodiment of the invention. The alert listing dashboard provides an overview of the status or health of a virtual computing environment. For example, the alert listing dashboard can display alerts 302, an overview of the virtual topology 304, server status 306, a health summary 308, among other things. As described, in some embodiments, an alert is triggered when a computing resource of an object in the virtual computing environment, such as a VM, has exceeded a certain predefined threshold. In the example shown, an alert has been triggered for a VM named "VM_MSExchange." The administrator can select a link associated with the VM using pointer 310. Selecting the link creates a "workspace" that is displayed in the virtualization management software application, as described in greater detail herein.

Figure 4:
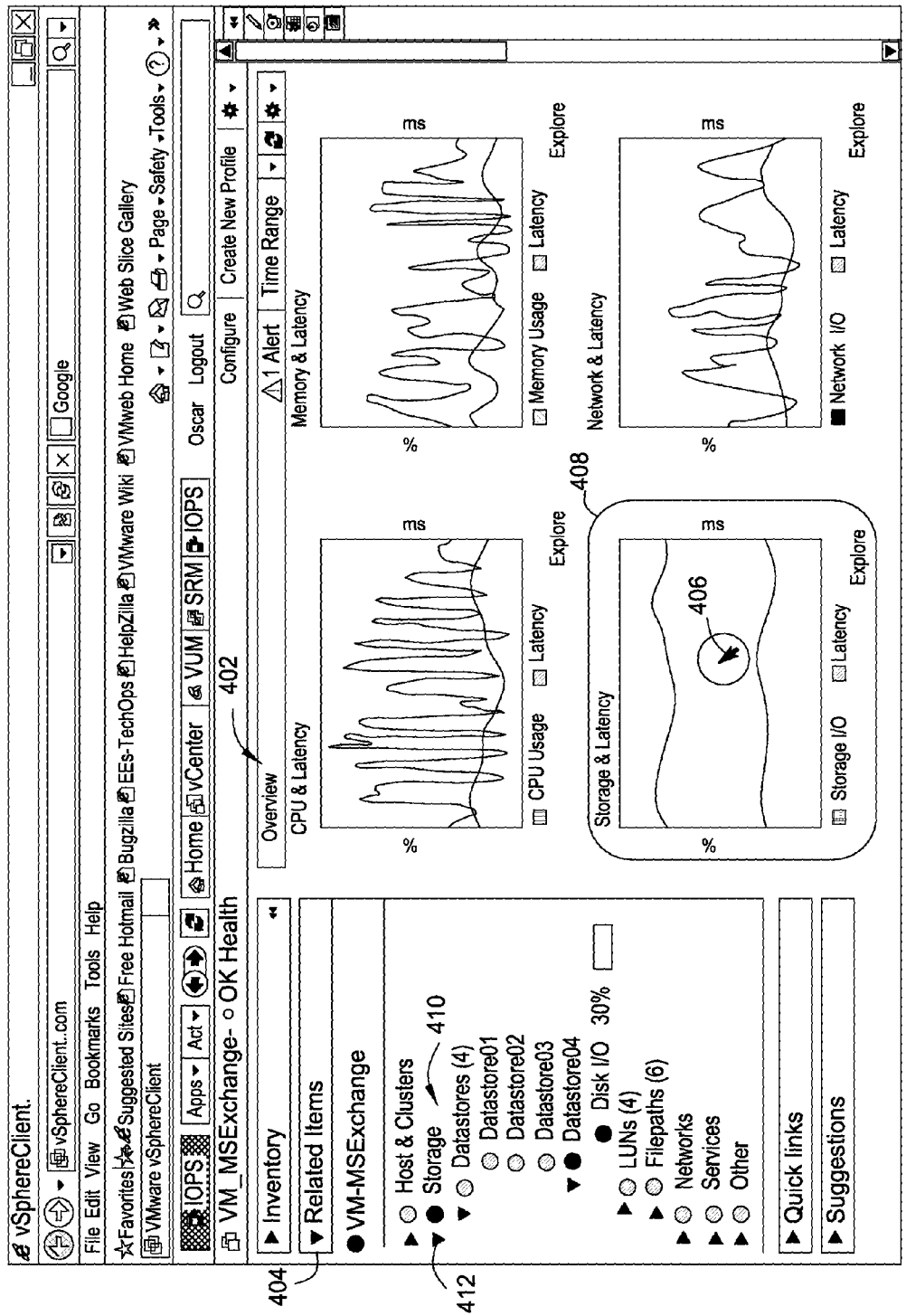
FIG. 4 depicts a workspace, according to one embodiment of the invention.

FIG. 4 depicts a workspace, according to one embodiment of the invention. The workspace is a graphical user interface that can be included in a virtualization management software application, such as VI client 106. The workspace includes an overview portion 402 and a related items portion 404. As shown, the overview portion 402 includes one or more display areas that correspond to different computing resources associated with the selected object. In the example in FIG. 4, the display areas correspond to CPU & Latency, Memory & Latency, Storage & Latency, and Network & Latency. Other computing resource metrics can also be shown.

The related items portion 404 of the workspace includes an organizational tree. The organizational tree can include branches for each of the different display areas included in the overview portion 402. In some embodiments, each branch can be expanded using a display element 412. In addition, the status or health of the branch can be indicated adjacent to the listing in the related items portion 404. For example, the status can be indicated with a color-coded symbol adjacent to the listing. A green color coding can represent good health, a yellow color coding can represent "OK" or medium health, and a red color coding can represent poor health.

In the example shown in FIG. 4, the storage branch 410 in the related items portion 404 is represented with an OK or medium status color coding, whereas the other branches are represented with a "good" status color coding. The administrator can deduce from this information that the problems in the virtual computing environment are related to storage. Accordingly, the administrator can select the Storage & Latency display area 408 included in the overview portion to "drill down" into storage management. As shown, the administrator can select the Storage & Latency display area 408 with a cursor 406.

Figure 5A:
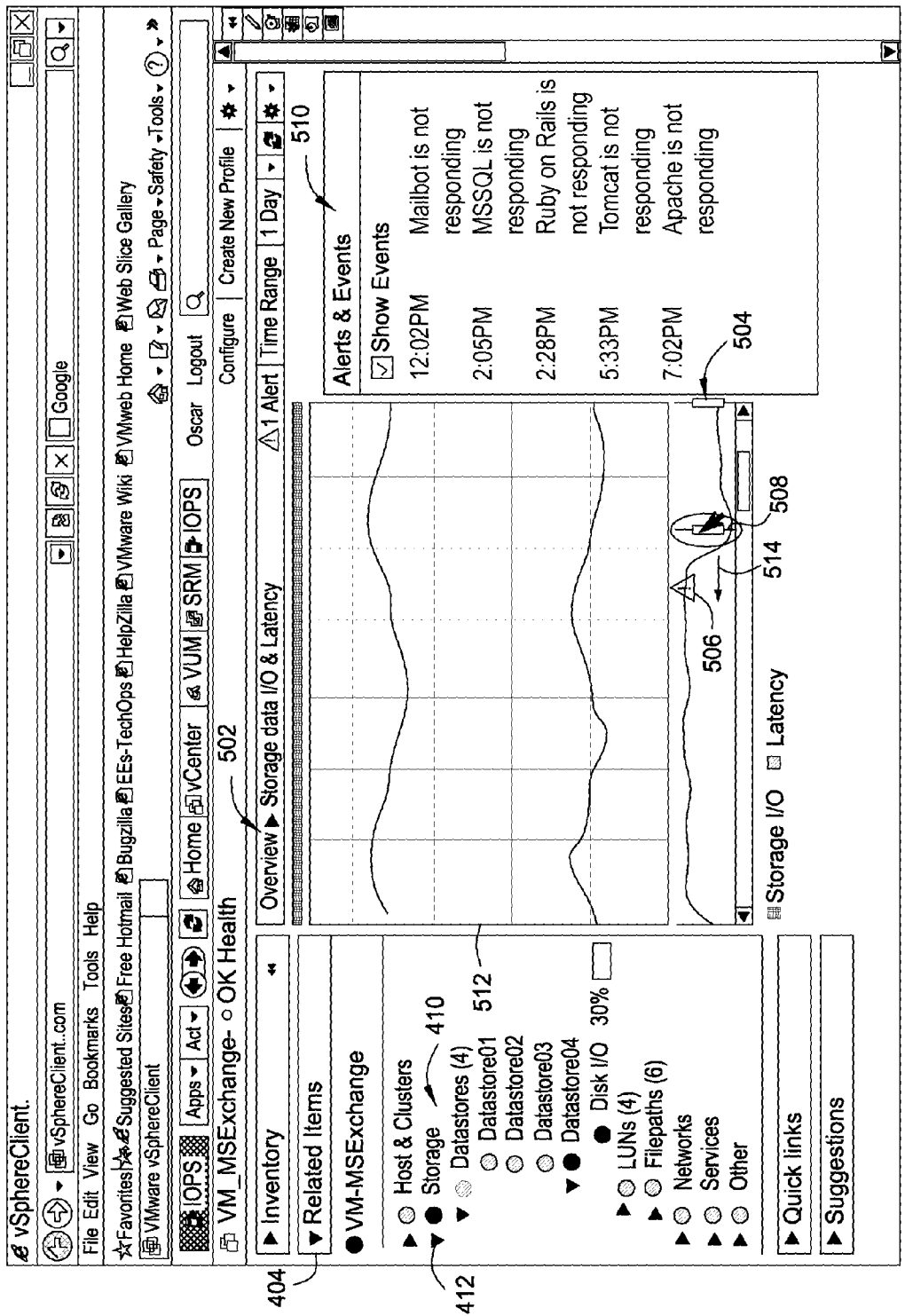
FIGS. 5A-5B depict a workspace that displays an overview of a computing resource at a particular point in time, according to one embodiment of the invention.

FIG. 5A depicts a workspace that displays an overview of a computing resource, according to one embodiment of the invention. As shown, the view of the workspace in FIG. 5A is updated relative to the view shown in FIG. 4. The view shown in FIG. 5A includes the same related items portion 404 as shown in FIG. 4, but includes an updated overview portion 502, and an alerts and events portion 510. The alerts and events portion 510 depicts the most recent alerts and events that have been triggered for the selected object. In one embodiment, the alerts and events portion 510 that is displayed is correlated to the chart shown in the overview portion 502 of the workspace. For example, clicking on an alert, such as a badged alert, in the chart can highlight the relevant alert description in the alerts and events portion 510, and vice versa.

The overview portion 502 includes a graph 512 that depicts the computing resources utilized by the selected object (i.e., virtual machine "VM_MSExchange") over a particular time period. A timeline 504 is illustrated below the graph 512. A slider 508 included in the timeline 504 can be moved by the user to cause the computing resources utilized by the selected object over a different time period to be displayed in the graph 512.

As shown, an alert 506 is present in the timeline 504 at a time that precedes the current time associated with the slider 508. Also, the user may notice that the activity of curves in the graph 512 at the current time are relatively "flat," which is not telling of anything, but that an alert 506 has happened in the past. Therefore, the user can choose to move the time slider 508 back in time. The user can move the slider 508 to a previous time, as indicated by arrow 514.

Figure 5B:
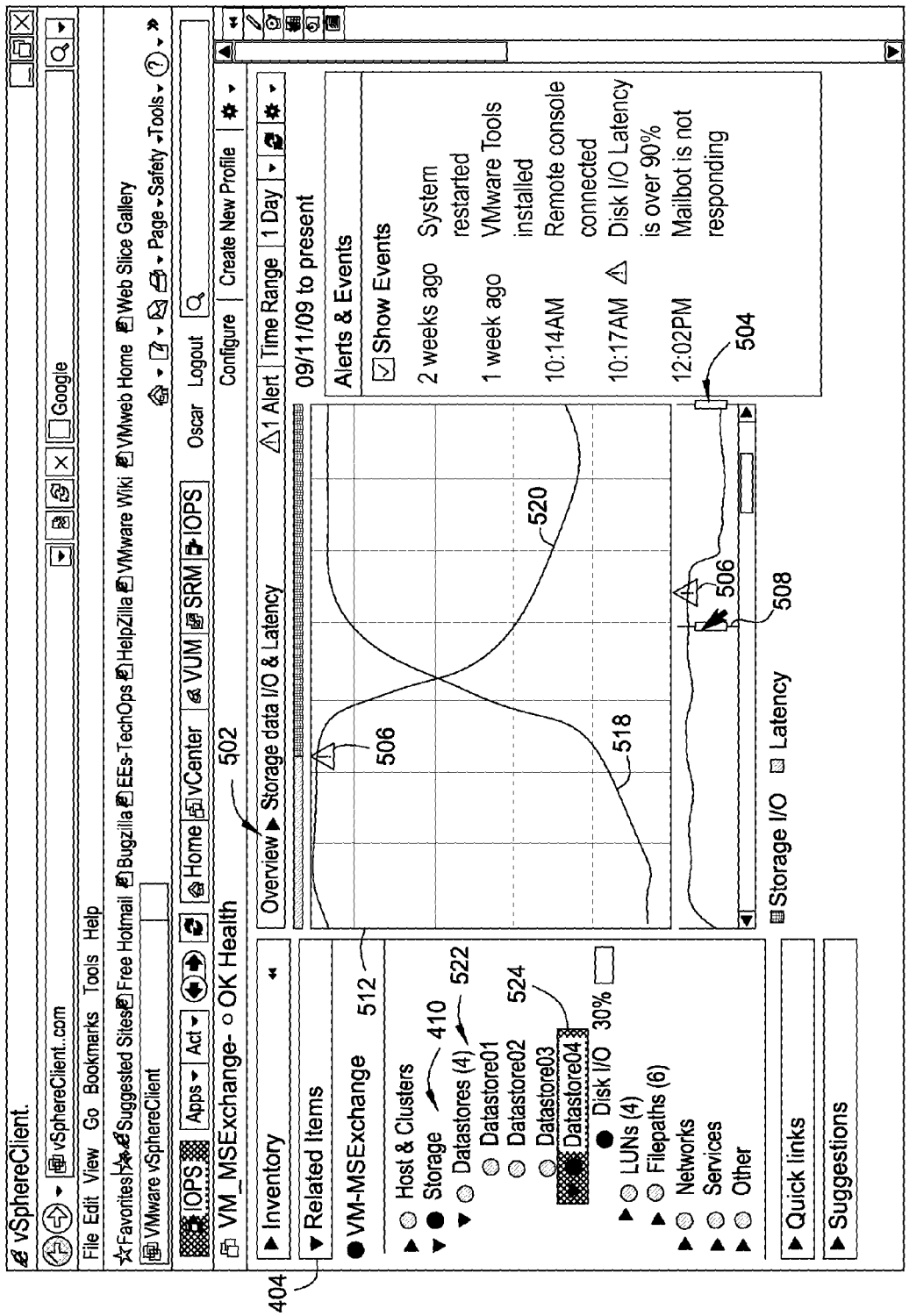

FIG. 5B depicts the workspace that displays an overview of the computing resource of FIG. 5A at a different point in time, according to one embodiment of the invention. As shown, the slider 508 included in the timeline 504 has been moved by the user to a previous point in time. The curves included in the graph 512 are updated to reflect the computing resource activity associated with the updated point in time. In the example shown, a curve associated with latency 518 begins to rise and a curve associated with storage inputs/outputs (I/Os) begins to fall after an alert 506 occurs.

Referring now to the related items portion 404 shown in FIG. 5B, the user has previously determined that the source of the problem is likely in storage resources based on the status coding of the storage branch 410. The user can then expand a "Datastores" link 522 to view the datastores, also referred to as "data centers," that are related to the selected virtual machine, i.e., related to virtual machine VM_MSExchange. When the Datastores link 522 is expanded, four datastores are listed. Other datastores that are not listed may be included in the virtual computing environment, but are not displayed in the related items portion 404. In some embodiments, only those objects related to the selected object (e.g., related to virtual machine VM_MSExchange) are listed in the related items portion 404. For example, the objects that are considered "related" to the select object can include those objects in the hierarchical path from the selected object to the root of the hierarchy. This provides the user with just the information that is useful to troubleshooting and does not clutter the interface with extraneous information.

As shown, the four datastores listed can also be color coded based on status. Three of the four datastores are shown with good status, and one datastore is shown with OK or medium status. The user can deduce from this information that the issue is likely included in the one datastore shown with OK or medium status, i.e., "Datastore04." The user can cause the view of the workspace to update to display the details of Datastore04 by selecting a link associated with Datastore04 using a cursor 524.

Figure 6:
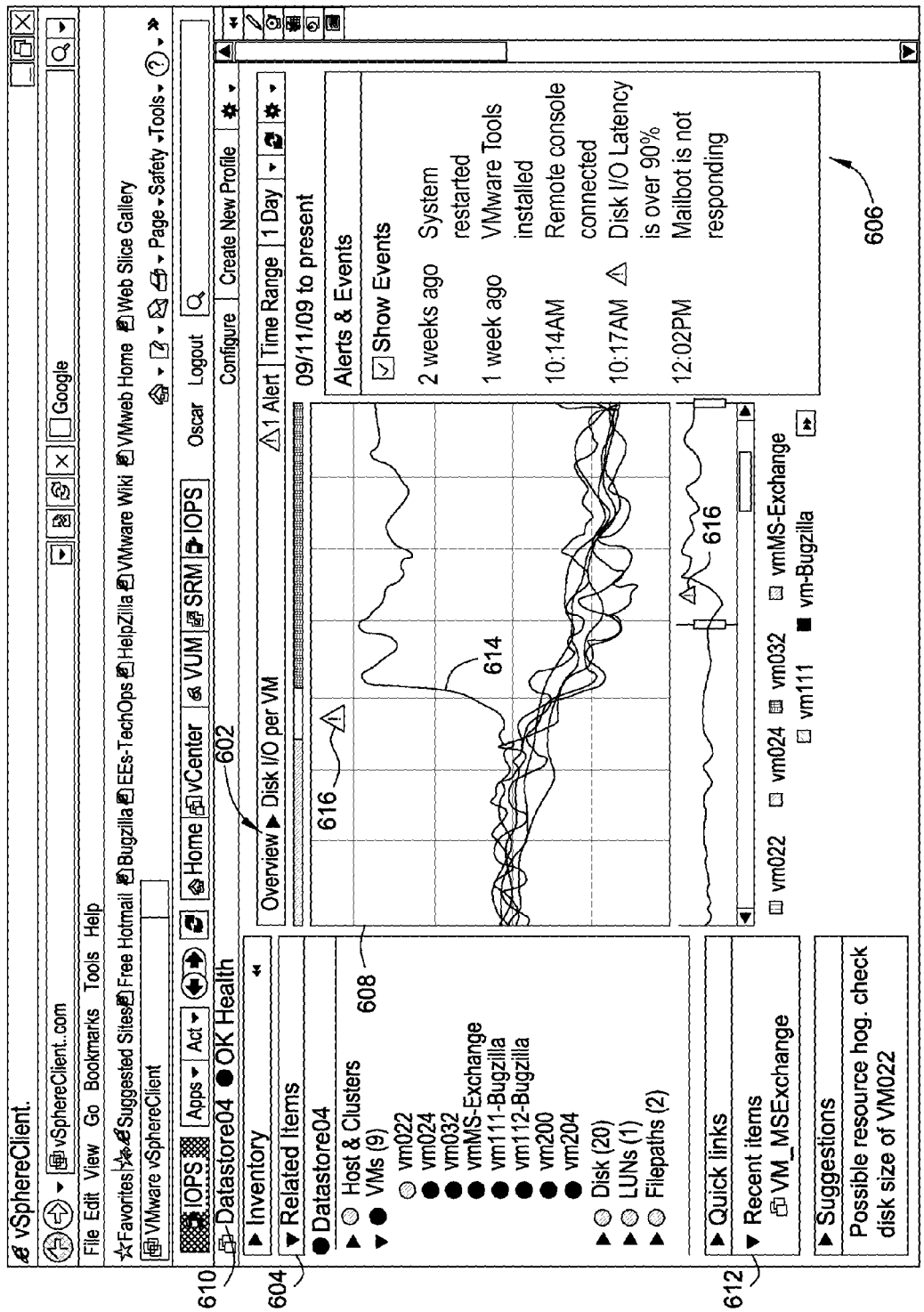
FIG. 6 depicts a view of the workspace after selection of an object from a related items portion of the workspace, according to one embodiment of the invention.

FIG. 6 depicts a view of the workspace after selection of an object from the related items portion 404 of the workspace, according to one embodiment of the invention. As described in FIG. 5B, the user has selected a link associated with Datastore04 from the related items portion 404. In response, the view of the workspace that is displayed includes an updated overview portion 602, an updated related items portion 604, and an updated alerts and events portion 606. As shown, the view of the workspace depicts the Disk I/Os per VM running on "Datastore04" 610.

Importantly, the workspace shown in FIG. 6 retains a context of the previously-displayed view of the workspace. In some embodiments, the graph that is displayed in the overview portion 602 in FIG. 6 corresponds to the same time period as the graph 512 shown in FIG. 5B. In addition, in some embodiments, the type of network resource that is being investigated and that is depicted in the views also persists when the workspace view changes to focus on a different object. For example, in FIG. 5B, the user is investigating storage resources; thus, when the user selects a different object to investigate, the view of the workspace, as shown in FIG. 6, continues to display information related to storage resources. In another example, a user can navigate the workspace to view a particular VM. Then, when the user navigates to the datastore that the VM is using, the workspace displays all VM usage of the datastore, such as is displayed in FIG. 6. Accordingly, rather than simply displaying an overview of the datastore, embodiments of the invention can show VMs for comparison, because viewing a VM was the "context" of the workspace.

The alerts and events portion 606 is updated to display the alerts and events associated with the selected object, i.e., associated with Datastore04.

The related items portion 604 is also updated to reflect the items that are associated with the selected object, i.e., associated with Datastore04. As shown, the related items portion 604 includes related Hosts & Clusters, VMs, Disks, LUNs (Logical Unit Numbers), and Filepaths. Other groupings of related items can also be shown in the related items portion 604. In the example shown, the VMs grouping is expanded and the VMs associated with Datastore04 are listed in the related items portion 604. Other VMs that are included in the virtualized computing environment, but not running on Datastore04, are not shown in the related items portion 604.

Each VM shown in the related items portion 604 can be associated with a status indicator, such as a color coded symbol, that indicates the status of the particular VM. In some embodiments, related items can be useful to the user to see while troubleshooting because a problem is often caused by a related object. As shown, "vm022" is associated with a good status, which can be indicated by a green circle adjacent to vm022, and the remaining VMs are associated with an OK or medium status, which can be indicated by a yellow circle adjacent to each of the other VMs. From this information, the administrator can deduce that vm022 is consuming a disproportionate amount of the storage resources of the data center to the detriment of the other VMs. This can be confirmed by the graph 608 included in the view of the workspace, which shows that the utilization curve 614 of vm022 rises sharply after the alert 616, whereas the utilization curves of the other VMs decrease after the alert 616.

As described above, the view of the workspace shown in FIG. 6 retains "context" from a view of a previously-investigated object as shown in FIG. 5B, such as time frame and computing resource type. In addition, a recent items portion 612 of the workspace can display recently viewed items, such as virtual machine "VM_MSExchange." The user can click on a link included in the recent items portion 612 to cause the view of the workspace to revert back to the previous view, e.g., as shown in FIG. 5B.

Figure 7:
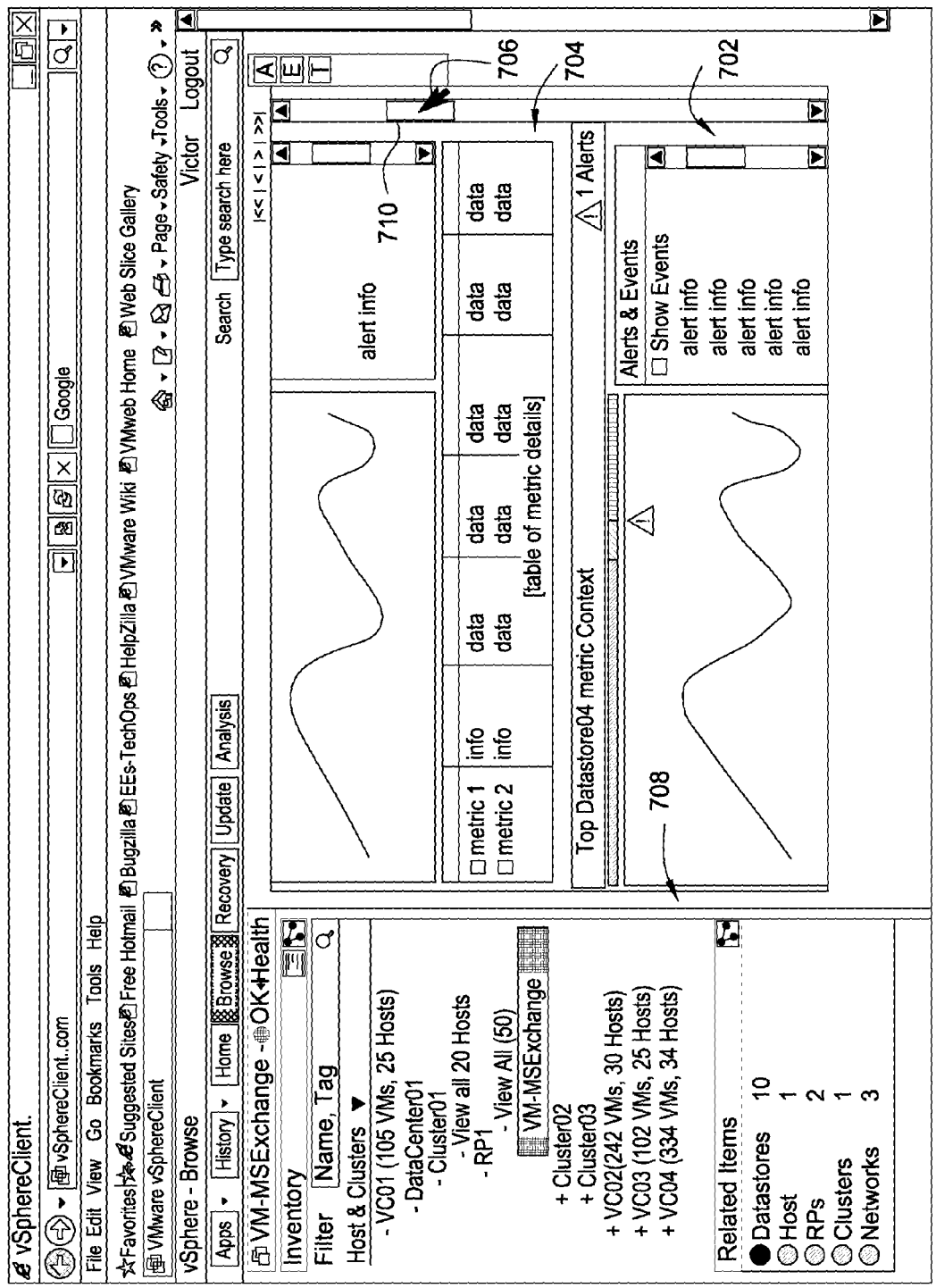
FIG. 7 depicts a scrolling history of a workspace, according to one embodiment of the invention.

In some embodiments, additional features of the workspace can be implemented to assist the user in troubleshooting the virtualized computing environment, such as providing a scrolling history. FIG. 7 depicts a scrolling history of a workspace, according to one embodiment of the invention. As shown, a current view 702 of the workspace is partially shown. A user can interact with a scrollbar 710 using a cursor 706 to "scroll" through the history of views of the workspace. As the user scrolls up, the previous views of the workspace become visible. As shown in FIG. 7, a previous view 704 is partially shown. In some embodiments, the previous views may be shaded or "greyed out," indicating that those views are previous views and not the current view. In addition, in some embodiments, a related items portion 708 of the workspace that corresponds to previous views can also be shaded or greyed out. Once the user selects one of the previous views, e.g., by double-clicking on the previous view, the previous view becomes the current view and is no longer greyed out. Reverting to a previous view provides the user the opportunity to try an alternate route troubleshooting, which can be helpful when troubleshooting along one path of views does not result in discovering the root cause of the problem.

In some embodiments, another feature of the workspace provides for a user to compare the performance of similar objects in the same context, side-by-side in the same view of the workspace.

Figure 8:
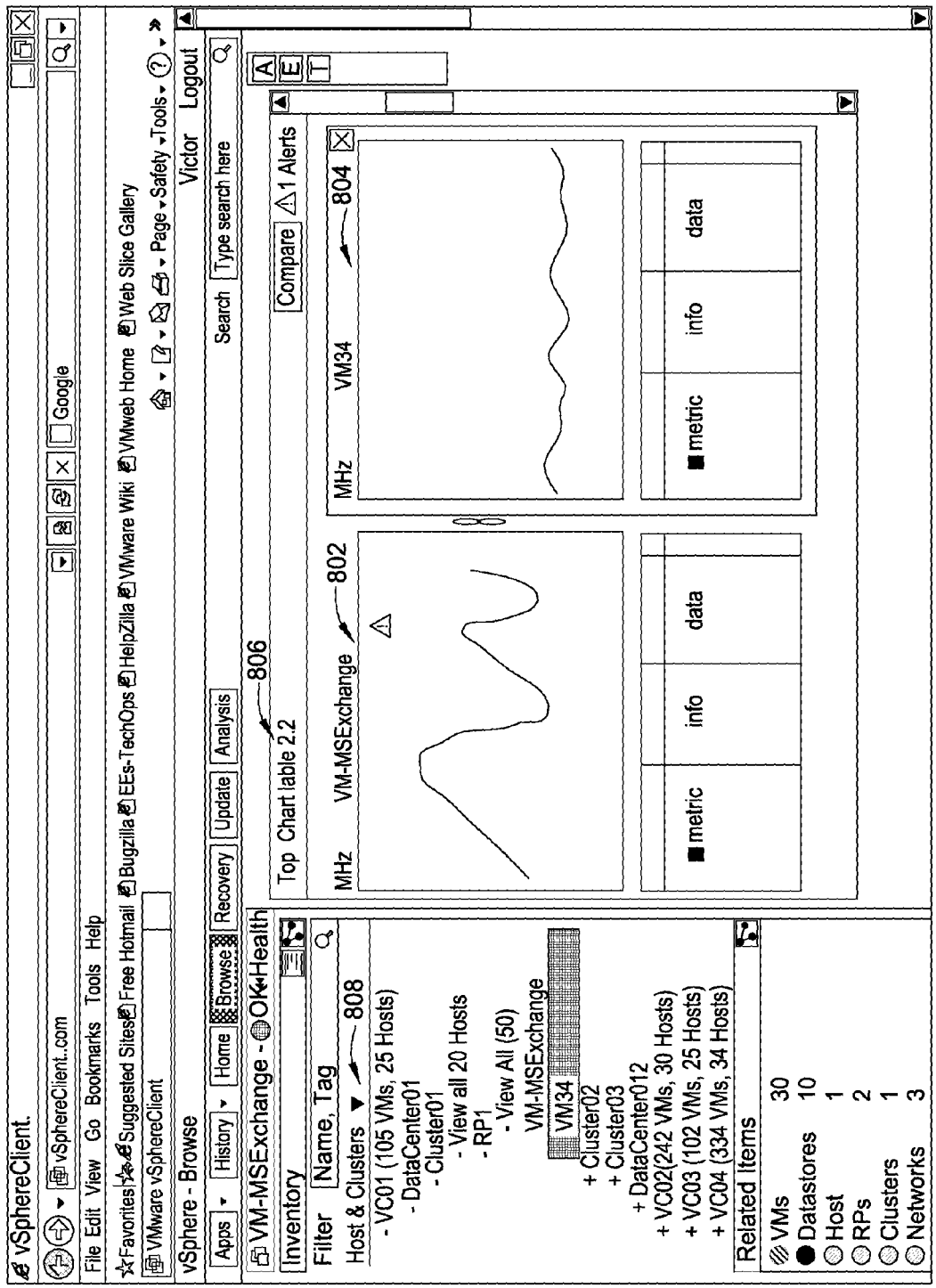
FIG. 8 depicts a workspace that includes a first graph and a second graph, according to one embodiment of the invention.

FIG. 8 depicts a workspace that includes a first graph 802 and a second graph 804, according to one embodiment of the invention. The first graph 802 corresponds to the computing resource utilization of a first object, i.e., virtual machine "VM_MSExchange," the second graph 804 corresponds to the computing resource utilization of a second object, i.e., virtual machine "VM34." In one embodiment, the two graphs 802, 804 are displayed corresponding to the same time period. In the embodiment shown in FIG. 8, the graphs 802, 804 are displayed side-by-side. In another embodiment, the graphs 802, 804 are displayed with one graph being above the other graph, where the graphs do not overlap. In yet another embodiment, the graphs can be displayed in an overlapping manner.

According to various embodiments, the graphs can be displayed based on a user dragging a visual indicator associated with the corresponding object into the overview portion 806 from an inventory portion 808 of the workspace. Providing the ability to view graphs corresponding to two different objects allows the user to quickly and easily compare the resource utilization of two objects in the virtualized computing environment.

Figure 9:
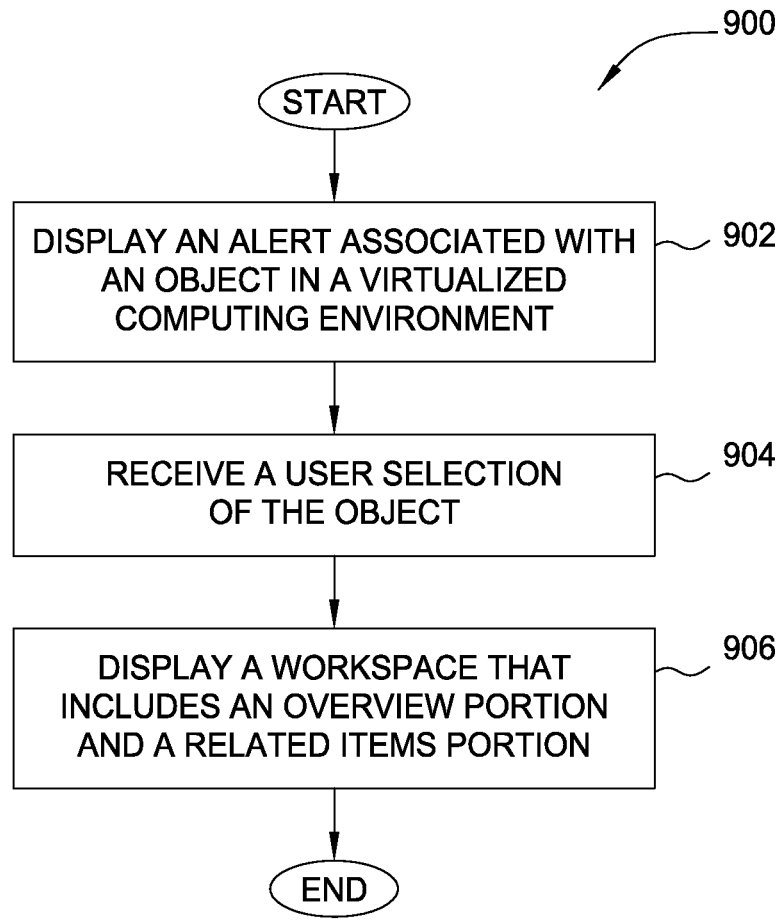
FIG. 9 is a flow diagram of method steps for displaying a workspace, according one embodiment of the invention.

FIG. 9 is a flow diagram of method steps for displaying a workspace, according one embodiment of the invention. Persons skilled in the art would understand that, even though the method 900 is described in conjunction with the systems of FIGS. 1-8, any system configured to perform the method steps, in any order, is within the scope of embodiments of the invention.

As shown, the method 900 begins at step 902, where a processing unit, such as the processing unit that executes the VI client 106, causes an alert associated with an object in a virtualized computing environment to be displayed. In some embodiments, the alert can be displayed in an alert listing dashboard, as shown in FIG. 3. The alert can be associated with a virtual center, a data center, a host computer, a cluster of host computer, a virtual machine, or any other object included in the virtualized computing environment.

At step 904, the processor receives a user selection of the object. For example, the user can select the object by clicking or double-clicking on a link or icon associated with the object.

At step 906, the processor causes a workspace to be displayed, where the workspace includes an overview portion and a related items portion. The overview portion displays the resource utilization of one or more computing resources associated with the selected object. The related items portion includes a listing of one or more other objects in the virtualized computing environment that are deemed "related" to the selected object. In one embodiment, another object is deemed to be related to the selected object if the other object is associated with the chain of objects between the selected object and the root object in a hierarchy of objects that defines the virtualized computing environment, as shown in FIG. 2. FIG. 4 depicts an example of a workspace, according to embodiments of the invention.

Figure 10:
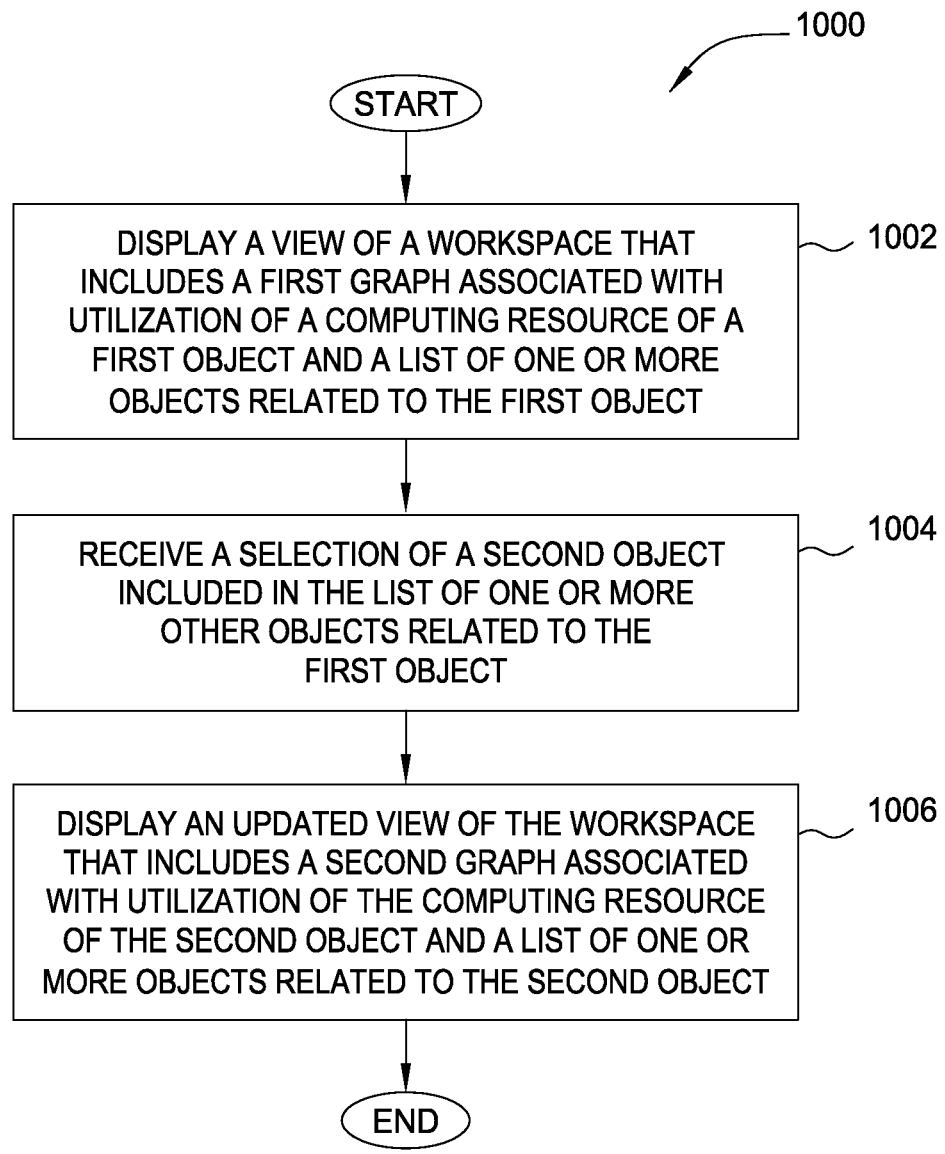
FIG. 10 is a flow diagram of method steps for maintaining a context between views of a workspace, according one embodiment of the invention.

FIG. 10 is a flow diagram of method steps for maintaining a context between views of a workspace, according one embodiment of the invention. Persons skilled in the art would understand that, even though the method 1000 is described in conjunction with the systems of FIGS. 1-8, any system configured to perform the method steps, in any order, is within the scope of embodiments of the invention.

As shown, the method 1000 begins at step 1002, where a processing unit, such as the processing unit that executes the VI client 106, causes a view of a workspace to be displayed, where the view of the workspace includes a first graph associated with resource utilization of a first computing resource associated with a first object in the virtualized computing environment and a list of one or more other objects that are related to the first object.

As described above, the graph can depict the resource utilization of the first computing resource over a certain period of time. In some embodiments, the user can move a slider to change the time period associated with the graph. According to various embodiments, the objects included in the list of one or more other objects that are related to the first object can be organized by object type, by computing resource, or by any other organizational structure. In addition, in some embodiments, the objects included in the list of one or more other objects that are related to the first object can be associated with a visual indication, such as a color, that represents the status of the object. For example, the status can be GOOD, MEDIUM, or POOR.

At step 1004, the processor receives a selection of a second object included in the list of one or more other objects related to the first object. For example, the selection can be made by a user selecting the second object using a mouse cursor or otherwise.

At step 1006, the processor causes an updated view of the workspace to be displayed, wherein the updated view includes a second graph associated with resource utilization of the first computing resource associated with the second object in the virtualized computing environment and a list of one or more other objects that are related to the second object. For example, if the first computing resource is associated with storage resources, then the first and second graphs both display utilization of storage resources. In some embodiments, the first and second graphs are associated with the same time period. Moreover, in some embodiments, any alerts included in the first graph can also be displayed in the second graph.

In sum, one or more embodiments of the invention provide a "workspace" that enables the user to explore an area of interest in the virtualized computing environment while troubleshooting a problem. The workspace provides a supportive environment that is flexible, intelligent, and maintains a context of the user's activities. For example, users can select and bring an object (e.g., a virtual machine) into view in the workspace. This causes appropriate tools and suggested actions to be displayed. In addition, the workspace can illustrate one or more computing resources utilized by the selected object. The user can also navigate to objects in the virtual computing environment that are related to and displayed in the workspace in the same "context" as the selected object. In some embodiments, the details of the related objects can be displayed in workspace for the same time period and for the same computing resource as for the selected object. By providing these features, a user interface according to one or more embodiments of the present invention allows the user to more quickly and easily troubleshoot and resolve issues in the virtualized computing environment.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A non-transitory computer-readable storage medium comprising instructions that, when executed in a computing device, perform the steps of:
enabling a graphical user interface to be displayed, wherein the graphical user interface is for monitoring a status of objects included in a hierarchically organized virtualized computing environment including a plurality of data stores each connected to one or more host computers, each host computer having one or more virtual machines running therein, said graphical user interface comprising a first section and a second section;
in response to receiving a user selection of a first virtual machine included in the hierarchically organized virtualized computing environment, displaying a first graph depicting utilization during a first period of time of a first computing resource associated with the selected first virtual machine in the first section, and displaying a listing of one or more objects included in the hierarchically organized virtualized computing environment in the second section, the displayed listing including only objects that are in a hierarchical path that includes the selected first virtual machine and the root of the hierarchy; and
in response to receiving a user selection of a first data store from the listing of one or more objects in the second section, displaying a second graph depicting utilization during the first period of time of the first computing resource associated with each of a plurality of virtual machines in the hierarchical path that includes the selected first data store in the first section, and displaying a listing of one or more objects included in the hierarchically organized virtualized computing environment in the second section, the displayed listing including only objects that are in a hierarchical path that includes the selected first data store and the root of the hierarchy,
wherein each object included in the displayed listings of one or more objects is associated with a displayed status indicator within the second section and corresponding to a status of the object, and
wherein receiving the user selection of the first data store from the displayed listing of one or more objects in the second section comprises dragging a visual indicator of the first data store into the first section.

2. The non-transitory computer-readable storage medium of claim 1, wherein the first computing resource comprises a processing resource, a disk resource, a memory resource, a network resource, or a system resource.

3. The non-transitory computer-readable storage medium of claim 1, wherein the one or more objects included in the listings are arranged in categories associated with one or more different computing resources.

4. The non-transitory computer-readable storage medium of claim 1, wherein the graphical user interface is displayed in response to a user selection of a representation of the first virtual machine associated with an alert.

5. The non-transitory computer-readable storage medium of claim 4, wherein the alert associated with the first virtual machine is triggered when utilization of a computing resource associated with the first virtual machine exceeds a threshold.

6. The non-transitory computer-readable storage medium of claim 1, wherein the status indicators for each object are the same shape and are color-coded, wherein the status corresponding to the displayed status indicator is selected from a group comprising good status having a green color, medium status having a yellow color, and poor status having a red color.

7. The non-transitory computer-readable storage medium of claim 1, wherein the graphical user interface further comprises a timeline section, which is displayed simultaneously with the first or second graph, and that separately depicts utilization of the first computing resource, wherein the timeline section represents a period of time that is greater than the first period of time and the time line section including a slider that enables a user to move the first or second graph from the first period of time to a different period of time.

8. The non-transitory computer-readable storage medium of claim 7, wherein the timeline section further comprises a displayed alert indicator in a temporal location that corresponds to an alert.

9. The non-transitory computer-readable storage medium of claim 1, wherein the graphical user interface further comprises: a third section that displays a listing of one or more recently selected objects.

10. A non-transitory computer-readable storage medium comprising instructions that, when executed in a computing device, perform the steps of:
  enabling a graphical user interface to be displayed, wherein the graphical user interface is for monitoring a status of objects included in a hierarchically organized virtualized computing environment including a plurality of data stores each connected to one or more host computers, each host computer having one or more virtual machines running therein, said graphical user interface comprising a first section and a second section;
  in response to receiving a user selection of a first virtual machine included in the hierarchically organized virtualized computing environment, displaying a first graph depicting utilization during a first period of time of a first computing resource associated with the selected first virtual machine in the first section, and displaying a listing of one or more objects included in the hierarchically organized virtualized computing environment in the second section, the displayed listing including only objects that are in a hierarchical path that includes the selected first virtual machine and the root of the hierarchy;
  in response to receiving a user selection of a first data store from the listing of one or more objects in the second section, displaying a second graph depicting utilization during the first period of time of the first computing resource associated with each of a plurality of virtual machines in the hierarchical path that includes the selected first data store in the first section, and displaying a listing of one or more objects included in the hierarchically organized virtualized computing environment in the second section, the displayed listing including only objects that are in a hierarchical path that includes the selected first data store and the root of the hierarchy;
  displaying a timeline section simultaneously with the first or second graph, said timeline section separately depicts utilization of the first computing resource, wherein the timeline section represents a period of time that is greater than the first period of time and the timeline section including a slider that enables a user to move the first or second graph from the first period of time to a different period of time; and
  displaying a recent items section simultaneously with the first section, the second section, and the timeline section, the recent items section displaying a visual indicator of the first virtual machine after the first data store is selected,
  wherein a user selection of the visual indicator of the first virtual machine in the recent items section causes the first section to revert back to a previous view, and
  wherein the previous view corresponds to the first time period.

11. The non-transitory computer-readable storage medium of claim 10, wherein the timeline section further comprises a displayed alert indicator in a temporal location that corresponds to an alert.

12. The non-transitory computer-readable storage medium of claim 10, wherein each object included in the listings of one or more objects is associated with a displayed status indicator within the second section and corresponding to a status of the object, wherein the status indicators for each object are the same shape and are color-coded, and wherein the status corresponding to the displayed status indicator is selected from a group comprising good status having a green color, medium status having a yellow color, and poor status having a red color.

13. A non-transitory computer-readable storage medium comprising instructions that, when executed in a computing device, perform the steps of:
  enabling a graphical user interface to be displayed, wherein the graphical user interface is for monitoring a status of objects included in a hierarchically organized virtualized computing environment including a plurality of data stores each connected to one or more host computers, each host computer having one or more virtual machines running therein, said graphical user interface comprising a first section and a second section;
  in response to receiving a user selection of a first virtual machine included in the hierarchically organized virtualized computing environment, displaying a first graph depicting utilization during a first period of time of a first computing resource associated with the selected first virtual machine in the first section, and displaying a listing of one or more objects included in the virtualized computing environment that are related to the first virtual machine in the second section, wherein the first virtual machine is separately identified in the second section as the selected object and the listing of one or more objects includes only those objects in a hierarchical path that includes the selected first virtual machine and the root of the hierarchy; and
  in response to receiving a user selection of a first data store from the listing of one or more objects in the second section, displaying a second graph depicting utilization during the first period of time of the first computing resource associated with each of a plurality of virtual machines in the hierarchical path that includes the selected first data store in the first section, and updating the second section such that the first data store is separately identified in the second section as the selected object and the listing of one or more objects is updated to include only those objects in a hierarchical path that includes the selected first data store and the root of the hierarchy,
  wherein each object included in the displayed listing of one or more objects is associated with a displayed status indicator within the second section and corresponding to a status of the object.

14. A non-transitory computer-readable storage medium comprising instructions that, when executed in a computing device, perform the steps of:
  enabling a graphical user interface to be displayed, wherein the graphical user interface is for monitoring a status of objects included in a hierarchically organized virtualized computing environment including a plurality of data stores each connected to one or more host computers, each host computer having one or more virtual machines running therein, said graphical user interface comprising a first section and a second section;
  in response to receiving a user selection of a first virtual machine included in the hierarchically organized virtualized computing environment, displaying a first graph depicting utilization during a first period of time of a first computing resource associated with a first virtual machine in the first section, and displaying a listing of one or more objects included in the virtualized computing environment that are related to the first virtual machine, wherein the first virtual machine is separately identified in the second section as the selected object and the listing of one or more objects includes only those data stores in a hierarchical path that includes the selected first virtual machine and the root of the hierarchy; and in response to receiving a user selection of one of the one or more data stores from the listing of one or more data stores in the second section, displaying a second graph depicting utilization during the first period of time of the first computing resource associated with each of a plurality of virtual machines in the hierarchical path that includes the selected data store, and updating the second section such that the selected data store is separately identified in the second section as the selected object and the listing of one or more objects is updated to include only those virtual machines in a hierarchical path that includes the selected data store and the root of the hierarchy, wherein each object included in the displayed listing of one or more objects is associated with a displayed status indicator within the second section and corresponding to a status of the object.

* * * * *